(12) United States Patent
Shimizu et al.

(10) Patent No.: US 11,339,985 B2
(45) Date of Patent: May 24, 2022

(54) AIR PURIFIER

(71) Applicant: SHARP KABUSHIKI KAISHA, Sakai (JP)

(72) Inventors: Eiichi Shimizu, Sakai (JP); Jinni Zhang, Sakai (JP); Takashi Kohama, Sakai (JP); Masaki Tabata, Sakai (JP); You Ka, Sakai (JP); Shota Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 47 days.

(21) Appl. No.: 17/017,035

(22) Filed: Sep. 10, 2020

(65) Prior Publication Data

US 2021/0080130 A1 Mar. 18, 2021

(30) Foreign Application Priority Data

Sep. 13, 2019 (JP) .............................. JP2019-167021

(51) Int. Cl.
| | |
|---|---|
| *B01D 46/00* | (2022.01) |
| *F24F 8/10* | (2021.01) |
| *F24F 3/14* | (2006.01) |
| *B01D 46/42* | (2006.01) |
| *F24F 8/50* | (2021.01) |

(52) U.S. Cl.
CPC ............ *F24F 8/10* (2021.01); *B01D 46/0005* (2013.01); *B01D 46/0036* (2013.01); *B01D 46/0038* (2013.01); *B01D 46/4227* (2013.01); *B01D 46/4254* (2013.01); *F24F 3/14* (2013.01); *B01D 2279/50* (2013.01); *F24F 8/50* (2021.01)

(58) Field of Classification Search
CPC . F24F 1/0011; B01D 46/0002; B01D 46/0005
See application file for complete search history.

(56) References Cited

U.S. PATENT DOCUMENTS

| | | | |
|---|---|---|---|
| 5,388,426 A | 2/1995 | Wada et al. | |
| 10,583,384 B2 | 3/2020 | Chu et al. | |
| 10,583,394 B2 | 3/2020 | Jones et al. | |
| 10,941,912 B2 * | 3/2021 | Belverge | ................. F24C 7/004 |

(Continued)

FOREIGN PATENT DOCUMENTS

| | | | |
|---|---|---|---|
| CN | 205084533 U | * | 3/2016 |
| CN | 205182381 U | * | 4/2016 |

(Continued)

OTHER PUBLICATIONS

Non-Final Rejection of U.S. Appl. No. 17/017,018 dated Dec. 9, 2021.

*Primary Examiner* — Robert A Hopkins
(74) *Attorney, Agent, or Firm* — ScienBiziP, P.C.

(57) ABSTRACT

An air purifier includes: a housing; a fan in the housing; an outlet in a top face of the housing, air being blown out via the outlet; an air passage spatially connecting the fan to the outlet; and an illumination unit configured to illuminate the air passage, wherein the air passage includes an upstream, first air passage and a downstream, second air passage, the first air passage extends upwards, the second air passage has a curved surface or an inclined surface inclined with respect to the first air passage, and the illumination unit illuminates the curved surface or the inclined surface.

7 Claims, 8 Drawing Sheets

(56) References Cited

U.S. PATENT DOCUMENTS 11,067,237 B2 * 7/2021 Angelotti ............ B05B 17/0615
2013/0231036 A1 9/2013 Kim et al.

FOREIGN PATENT DOCUMENTS

| DE | 102012020539 A1 | 4/2014 |
| JP | 2010-240555 A | 10/2010 |
| WO | 2015/049915 A1 | 4/2015 |
| WO | 2015/141023 A1 | 9/2015 |
| WO | 2016/024351 A1 | 2/2016 |

* cited by examiner

AIR PURIFIER

CROSS-REFERENCE TO RELATED APPLICATION

The present application claims priority from Japanese Application JP2019-167021, the content of which is hereby incorporated by reference into this application.

BACKGROUND OF THE INVENTION

1. Field of the Invention

The present invention relates to air purifiers.

2. Description of the Related Art

As an example, Japanese Unexamined Patent Application Publication, Tokukai, No. 2010-240555 discloses an air purifier including: an air intake port through which air is drawn in; a purification means for purifying the air drawn in through the air intake port; an air feeding means for feeding air to the purification means; an air blowing means for blowing out the cleaned air indoors; an impurity detecting means for detecting air impurity; a display means for displaying the detected impurity; and a control means for producing a visual display of changes of the quantity of air impurity up to the present.

SUMMARY OF THE INVENTION

The air purifier described in Japanese Unexamined Patent Application Publication, Tokukai, No. 2010-240555 however includes an impurity display unit on a frontal top portion of the main body. The light source hence always emits light forwards or upwards, which can cause the user to find the light emitted by the light source excessively bright.

In view of these problems, the present invention, in an aspect thereof, has an object to provide, as an example, an air purifier capable of producing a visual display of various conditions while reducing the chances of the user finding the light excessively bright.

The present invention, in an aspect thereof, is directed to an air purifier including: a housing; a fan in the housing; an outlet in a top face of the housing, air being blown out via the outlet; an air passage spatially connecting the fan to the outlet; and an illumination unit configured to illuminate the air passage, wherein the air passage includes an upstream, first air passage and a downstream, second air passage, the first air passage extends upwards, the second air passage has a curved surface or an inclined surface inclined with respect to the first air passage, and the illumination unit illuminates the curved surface or the inclined surface.

DETAILED DESCRIPTION OF THE INVENTION

The following will describe embodiments of the present invention with reference to drawings. Identical or equivalent elements in the present specification and the drawings are denoted by the same reference numerals, and description thereof is not repeated. Those elements which are not directly related to the present invention may not be shown. The specifications of the elements described in the embodiments are for illustrative purposes only and by no means limit the scope of the invention.

First Embodiment

Figure 1:
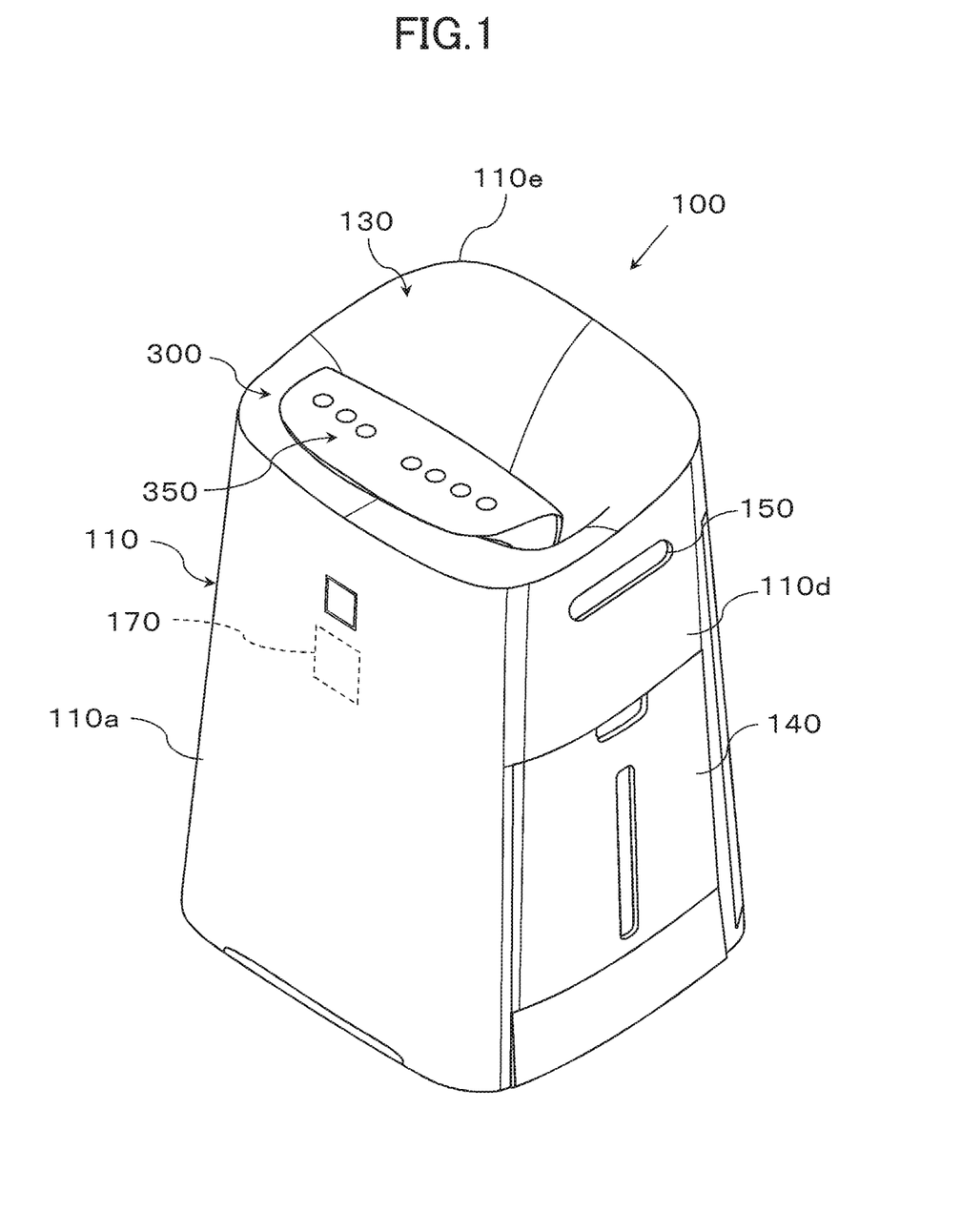
FIG. 1 is a perspective view of an air purifier in accordance with Embodiment 1 of the present invention.
Figure 2:
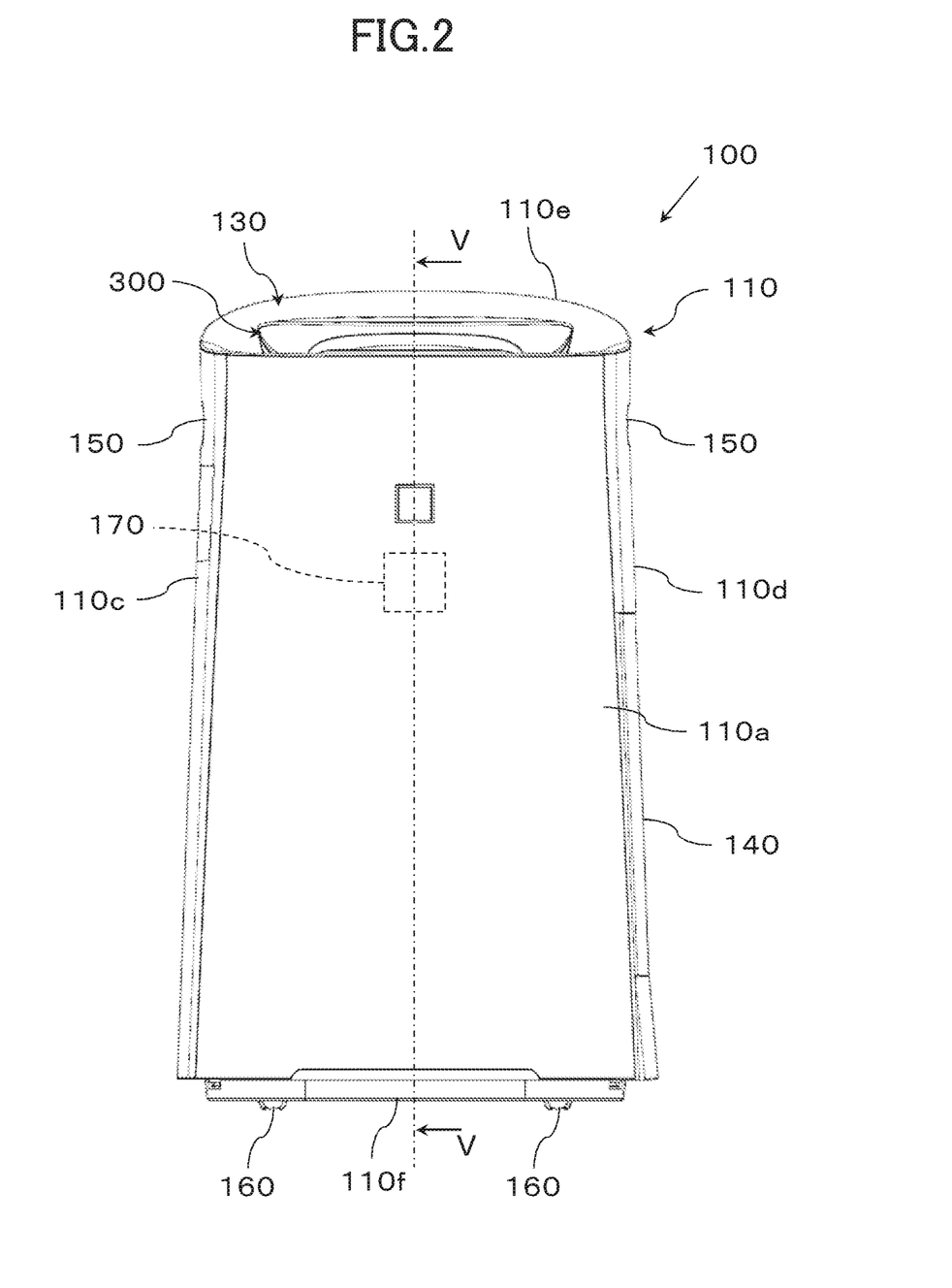
FIG. 2 is a front view of the air purifier shown in FIG. 1.
Figure 3:
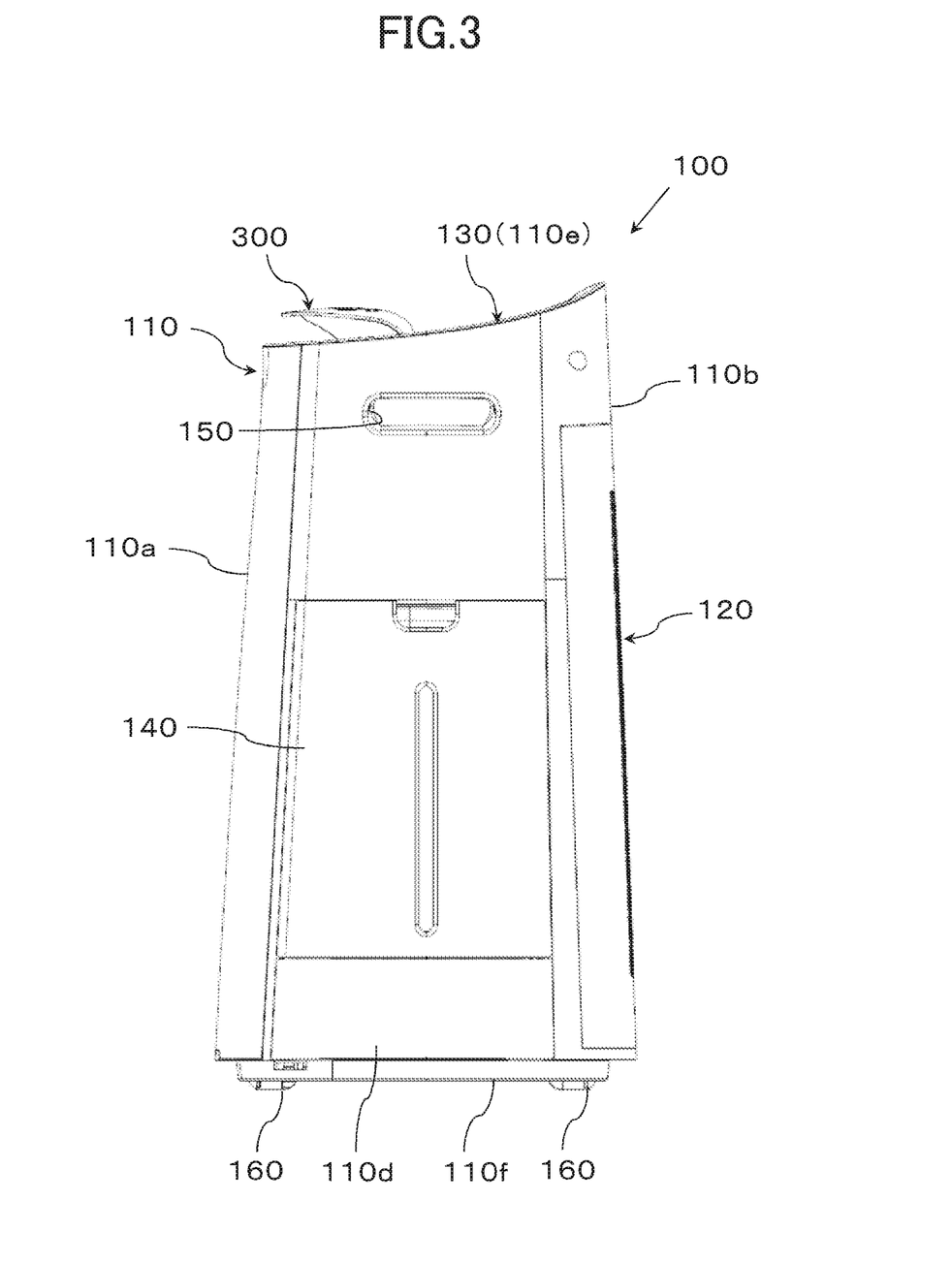
FIG. 3 is a right-side view of the air purifier shown in FIG. 1.
Figure 4:
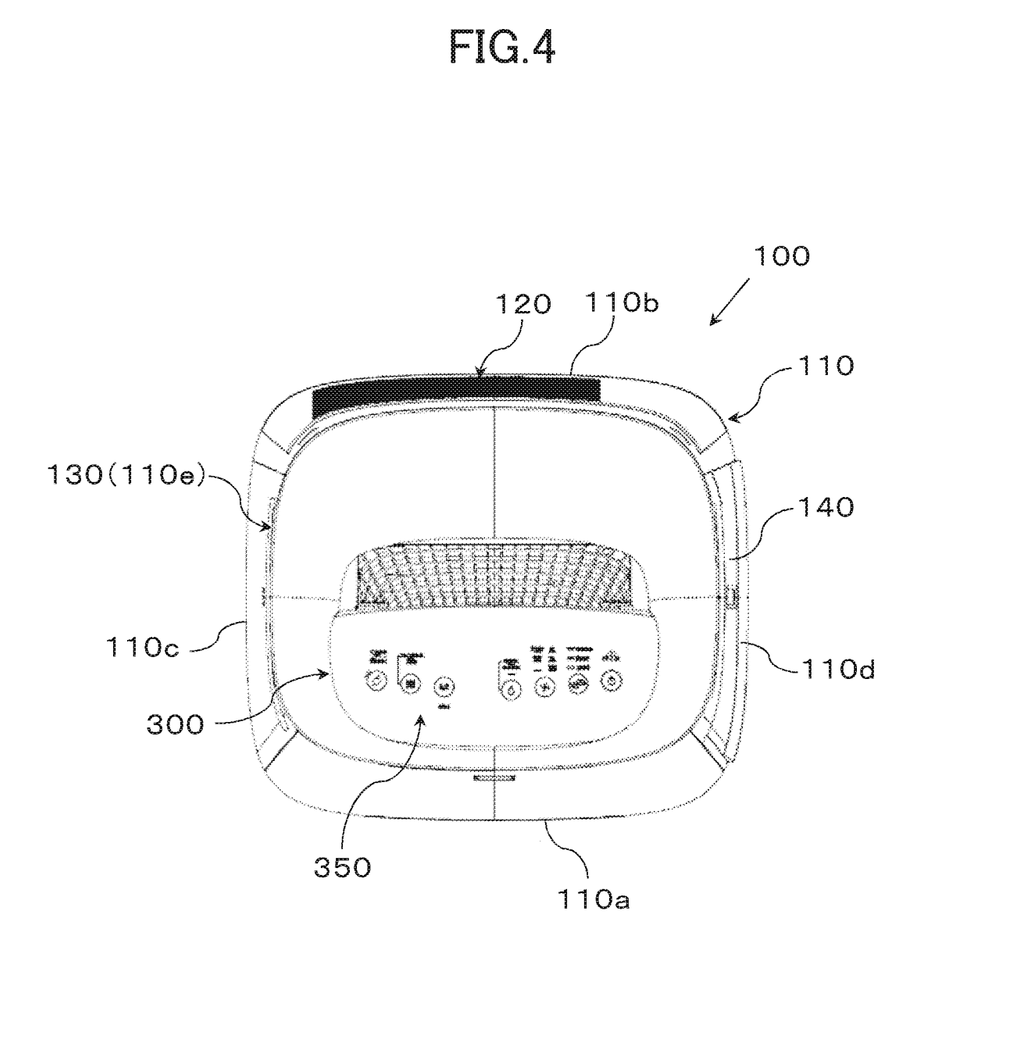
FIG. 4 is a plan view of the air purifier shown in FIG. 1.
Figure 5:
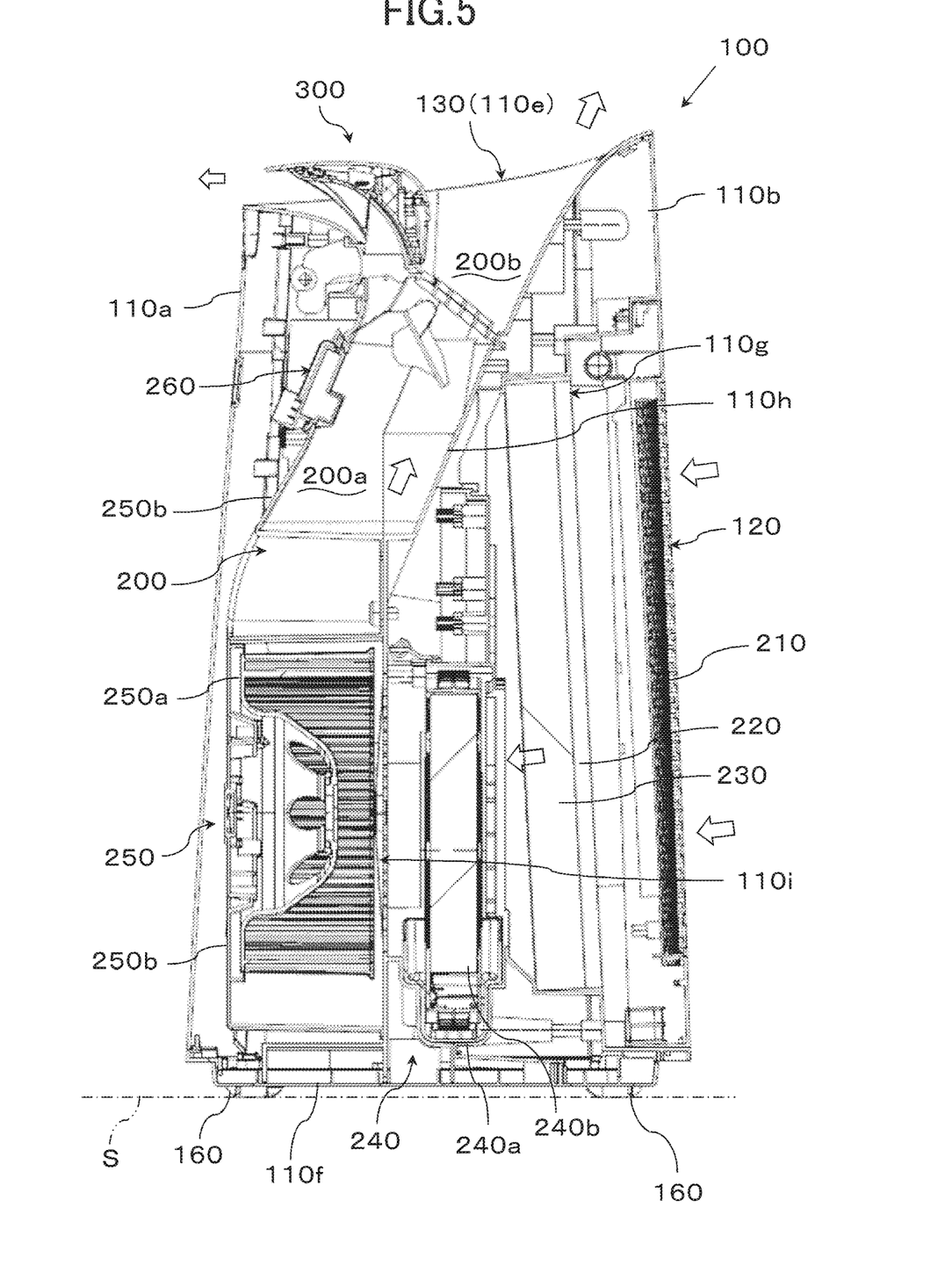
FIG. 5 is a cross-sectional view of the air purifier shown in FIG. 2, taken along line V-V.

A description is now given of the overall structure of an air purifier 100 in accordance with Embodiment 1 of the present invention with reference to FIGS. 1 to 5. Throughout the following description, the side of the air purifier 100 on which there is provided an inlet 120 is referred to as the backside or rear side, and the side of the air purifier 100 opposite the backside as the frontal side or front side. The "right side of the air purifier 100" is the right side of the air purifier 100 as the air purifier 100 is viewed from the front. The "left side of the air purifier 100" is the left side of the air purifier 100 as the air purifier 100 is viewed from the front. FIG. 1 is a perspective view of the air purifier 100. FIG. 2 is a front view of the air purifier 100. FIG. 3 is a right-side view of the air purifier 100. FIG. 4 is a plan view of the air purifier 100. FIG. 5 is a cross-sectional view of the air purifier 100 shown in FIG. 2, taken along line V-V.

The exterior of the air purifier 100 is described with reference to FIGS. 1 to 4. The air purifier 100 includes a housing 110. The housing 110 includes a front face 110a, a rear face 110b, a left side face 110c, a right side face 110d, a top face 110e, and a bottom face 110f. The housing 110 is shaped substantially like a frustum with an opening in the top face 110e. The housing 110 has a cross-section that increases in size from top to bottom. Specifically, the front face 110a and the rear face 110b are inclined outwardly in such a manner that the distance separating the front face 110a and the rear face 110b can increase toward the bottom. Likewise, the left side face 110c and the right side face 110d are inclined outwardly in such a manner that the distance separating the left side face 110c and the right side face 110d can increase toward the bottom. The front face 110a is connected to the left side face 110c and the right side face 110d by respective smoothly curved surfaces. Likewise, the rear face 110b is connected to the left side face 110c and the right side face 110d by respective smoothly curved surfaces. As described here, the housing 110 has a surrounding outer surface that is formed in a substantially rectangular shape in a plan view.

The rear face 110b of the housing 110 has formed therein the inlet 120 through which air (wind) is taken in. The inlet 120 is composed of a plurality of holes formed in a detachable rear face panel of the housing 110. In the top face 110e of the housing 110 is there provided an outlet 130 through which air (wind) is blown out. There is also provided a detachable water feed tank 140 on the right side face 110d of the housing 110. A grip section 150 is provided in the upper part of each of the left side face 110c and the right side face 110d of the housing 110, so that the housing 110 can be carried around easily. A plurality of wheels 160 is attached onto the bottom face 110f of the housing 110, so that the air purifier 100 can be moved smoothly on a floor S. The outlet 130 is fitted with a louver 300 (which will be described later in detail). The louver 300 switches the direction of the air (wind) coming out via the outlet 130.

The housing 110 may include, on the front face 110a, a display unit 170 that displays the operation status of the air purifier 100. The display unit 170, as an example, includes a substrate with LED light sources and emits light onto the transmissive front face 110a of the housing 110 from the inside of the housing 110, to display, for example, the operation status of the air purifier 100 for viewing by the user.

A description is now given next of the internal structure of the air purifier 100 with reference to FIG. 5. The interior of the housing 110 is structured so as to allow air to flow from the inlet 120 to the outlet 130. Inside the housing 110 are there provided a pre-filter 210, a deodorization filter 220, a dust filter 230, a humidifier unit 240, an air blower 250, and an electric discharger 260 that are arranged in this order from the inlet 120 toward the outlet 130.

The pre-filter 210 is for catching dust and dirt (coarse dust) in the air passing therethrough. The pre-filter 210 is formed of, for example, a meshed sheet of polypropylene. The pre-filter 210 is attached to the inside of the rear face 110b of the housing 110 in such a manner as to sit against the inlet 120.

The housing 110 includes therein a container unit 110g containing the deodorization filter 220 and the dust filter 230. The container unit 110g is provided in the rear of the housing 110 and opposite the inlet 120 of the housing 110 and is a space indented substantially like a rectangular parallelepiped. The container unit 110g contains the deodorization filter 220 and the dust filter 230 sitting next to each other in this order in the air flow direction.

The deodorization filter 220 is for adsorbing odorous components (e.g., acetoaldehyde, ammonia, and acetic acid) in the passing air to deodorize the air. The deodorization filter 220 has, as an example, a structure that includes a rectangular frame body, a piece of nonwoven polyester fabric attached to the frame body, activated carbon dispersed uniformly on the nonwoven polyester fabric, and another piece of nonwoven polyester fabric placed on the activated carbon.

The dust filter 230 is for catching dust and dirt in the passing air, more specifically for catching tiny dust and dirt and fine particles, such as particulate matter 2.5, that have a smaller particle diameter than a prescribed particle diameter (e.g., 3 μm). The dust filter 230 includes, for example, a HEPA (high efficiency particulate air) filter and has a structure that includes a filtering medium and a frame member attached to the filtering medium by hot-melt extrusion so as to cover the filtering medium.

The humidifier unit 240 is for humidifying air passing therethrough. The humidifier unit 240 is disposed before the container unit 110g, more specifically before the dust filter 230. The humidifier unit 240 includes a tray 240a for collecting water and a humidifier filter 240b having a lower portion thereof immersed in the water in the tray 240a. The tray 240a is structured so that water can be supplied from the water feed tank 140 to the tray 240a. The humidifier unit 240 humidifies air by evaporating water from the humidifier filter 240b when the humidifier filter 240b is blown by wind.

The air blower 250 is disposed before the humidifier unit 240, more specifically on the front bottom of the housing 110. The air blower 250 includes a fan 250a and a fan motor (not shown) for driving the fan 250a. The fan 250a is built around a centrifugal fan such as a sirocco fan so as to draw in air in the axial direction thereof (front-back direction) and to blow out the air in the circumferential direction thereof (upwards).

There is provided a partition wall 110h between the humidifier unit 240 and the air blower 250. The partition wall 110h is disposed so as to partition the interior of the housing 110 into a frontal portion and a rear portion and has a backward tilted upper portion. The humidifier unit 240, the dust filter 230, the deodorization filter 220, and the pre-filter 210 are disposed behind the partition wall 110h. The air blower 250 is disposed before the partition wall 110h. The partition wall 110h has a plurality of air holes 110i in communication with the air blower 250. This structure enables the air taken into the interior of the housing 110 via the inlet 120 to be drawn in by the air blower 250 via the air holes 110i.

Inside the housing 110 is there provided an air passage 200 spatially connecting the fan 250a to the outlet 130. The air passage 200 includes a first air passage 200a located in the upstream side thereof and a second air passage 200b located in the downstream side thereof. The first air passage 200a includes a duct that has a generally rectangular cross-section. The duct is composed of the partition wall 110h and a fan container 250b containing the fan 250a. The fan container 250b has an upper portion (portion above the fan 250a) extended upwards with a backward tilt similarly to the partition wall 110h and attached so as to cover the front face of the partition wall 110h. As described in the foregoing, the first air passage 200a is structured, as an example, so as to have an upwardly rearward inclination direction. The first air passage 200a is structured so as to extend upwardly rearwards and may alternatively be structured so as to extend at least upwards.

The fan container 250b has an upper wall surface on which the electric discharger 260 is disposed. The electric discharger 260 is, as an example, disposed so as to have acicular discharge electrodes thereof exposed inside the air passage 200 to generate ions under high voltage. The ions generated by the electric discharger 260 are blown to the outside via the outlet 130 by the air flow generated by the air blower 250.

The second air passage 200b is connected to the top end portions of the fan container 250b and the partition wall 110h (the end portions with respect to the air feed direction). The second air passage 200b connects the first air passage 200a to the outlet 130. The housing 110 includes a top cover (not shown) composed integrally of the outlet 130, the second air passage 200b, and the outer circumferential surface of the top portion of the housing 110. The second air passage 200b is provided as a part this top cover.

In this structure, the air drawn in by the rotating fan 250a via the inlet 120 passes through the pre-filter 210, the deodorization filter 220, and the dust filter 230 while traveling toward the front inside the housing 110. The air is thus purified free of odor, dust, and dirt, before being humidified by the humidifier unit 240. The ions generated by the electric discharger 260 are then added to the air while the air is traveling upwardly rearwards from the air blower 250. The ion-containing air is blown out via the outlet 130. More specifically, the ion-containing air is blown out forwards or downwardly forwards via a first outlet 130a (detailed later) and upwardly rearwards via a second outlet 130b (detailed later).

The air purifier 100 has no function of cleaning the pre-filter 210 and may alternatively include, for example, a cleaning unit between the pre-filter 210 and the deodorization filter 220 to clean the pre-filter. The air purifier 100 has an air-humidifying structure and an ion-generating structure and may alternatively have, for example, only a function of catching indoor dust and dirt and have an air-dehumidifying function.

Figure 6:
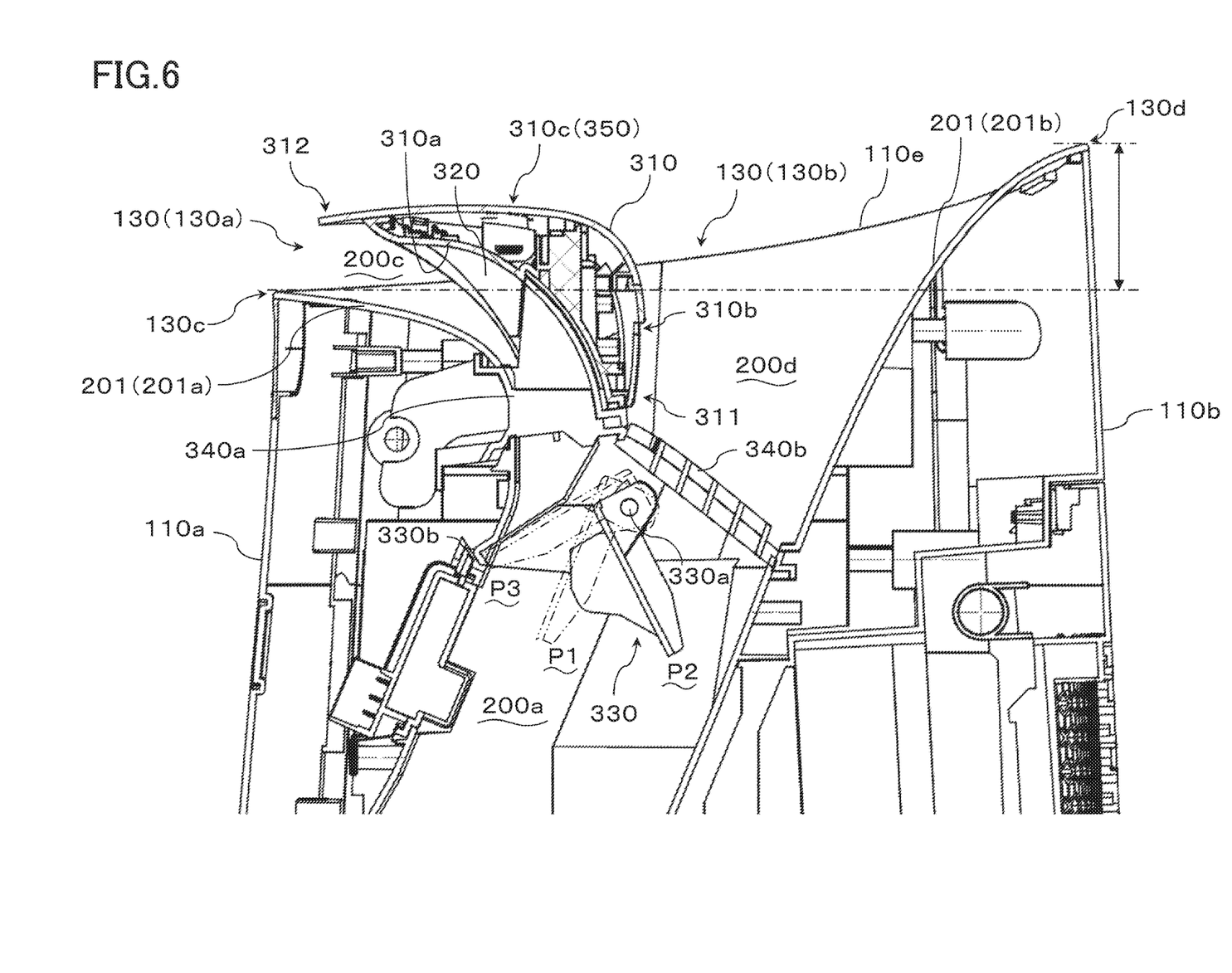
FIG. 6 is an enlarged cross-sectional view of a part of an outlet of the air purifier shown in FIG. 5.

A description is now given of the outlet 130 and the second air passage 200b with reference to FIG. 6. FIG. 6 is an enlarged cross-sectional view of a part of the outlet 130 of the air purifier 100.

The outlet 130 is formed in the top face 110e of the housing 110. The outlet 130 is, as an example, formed across the entire top face 110e and shaped substantially like a rectangle elongated in the left-right direction. The top face 110e is therefore an edge portion of the outlet 130. The outlet 130 is formed across the entire top face 110e and may alternatively be formed in a part of the top face 110e.

The second air passage 200b has a curved face or an inclined face inclined from the first air passage 200a. The second air passage 200b has, as an example, such a curved wall section 201 that the second air passage 200b can expand toward the outlet 130. In other words, the second air passage 200b has the wall section 201 that is formed as a curved face. The wall section 201 is formed so as to provide an opening that expands toward the outlet 130. An "expanding opening" means that the second air passage 200b has an increasing cross-sectional area when the second air passage 200b is cut in a direction perpendicular to the air flow direction (the inclination direction of the first air passage 200a). The wall section 201 is curved so as to project in the direction of the interior top part of the housing 110. In other words, the wall section 201 is shaped substantially like a funnel inclined (curved) from the outlet 130 toward the interior bottom part of the housing 110.

The second air passage 200b has the wall section 201 that is formed as a curved face as described in the foregoing and may alternatively have, for example, an inclined face inclined from the first air passage 200a. In such cases, the wall section 201 is formed so as to expand toward the outlet 130. As another alternative, the second air passage 200b may have an inclined face inclined from the vertical.

The louver 300 is for changing the direction of the air (wind) coming out via the outlet 130. The louver 300 is rotated by a rotation mechanism 400 (which will be described later; see FIGS. 7A-7C) so as to be capable of changing the direction of the air (wind) coming out via the outlet 130. The louver 300 is provided with an operation unit 350 through which various operation settings can be made for the air purifier 100. Various operation settings for the air purifier 100 include, for example, start-of-operation, end-of-operation, selectable operation modes, air volume, wind direction, and other settings related to the air purifier 100. In other words, the louver 300 additionally serves as the operation unit 350. The operation unit 350 is built around, for example, a touch panel. As described in the foregoing, when the louver 300 is structured to have both a function of changing the wind direction and a function of enabling various operation settings on the air purifier 100 as described above, the louver 300 may require fewer components in terms of design, thereby allowing for aesthetically attractive designs. Various operation settings are made through the operation unit 350 of the louver 300 and may alternatively be made through, for example, a setup unit provided somewhere other than in the louver 300.

The louver 300 extends from the air passage 200 to the outlet 130. More specifically, the louver 300 is disposed so as to project out of the housing 110 from the second air passage 200b.

The louver 300 includes a base body 310 that in turn includes a combined pair of bow-shaped frontal and rear platelike members. The base body 310 is shaped generally like a crescent moon in a side view thereof. The frontal platelike member includes a curved face section 310a that extends in the direction of the outlet 130 from the air passage 200 and that is curved toward the front of the housing 110. The rear platelike member includes a rear face portion 310b extending in the direction of the outlet 130 from the air passage 200 and a top face portion 310c extending in a curved manner from the rear face portion 310b toward the front. The base body 310 is hollow to accommodate a substrate, a touch panel, and other components of the operation unit 350 in the hollow portion. More specifically, the top face portion 310c is provided thereon with a substrate, a touch panel, and other components of the operation unit 350, so that the user can manually operate the top face portion 310c for the air purifier 100 to carry out various operations.

The part of the base body 310 located on the side of the base unit 311, in other words, the part of the base body 310 located inside the air passage 200, is disposed across the interior of the second air passage 200b in the left-right direction to partition the second air passage 200b into a frontal portion and a rear portion. The part of the base body 310 located on the side of the base unit 311 is also disposed toward the front inside the second air passage 200b. The part of the base body 310 located on the side of the base unit 311 is formed to have a left-right width that increases with the left-right width of the second air passage 200b from the bottom toward the top.

The second air passage 200b is separated into a frontal portion and a rear portion by the base body 310 as described in the foregoing. Throughout the following, the wind channel positioned forwards of the base body 310 will be referred to as the first branch passage 200c. The first branch passage 200c primarily denotes a space surrounded by the curved face section 310a and the part of the wall section 201 that extends from the front face to the side face. In other words, a part of the louver 300 forms the first branch passage 200c. Throughout the following, the outlet of the first branch passage 200c will be referred to as the first outlet 130a, and the wind channel positioned rearwards of the base body 310 as the second branch passage 200d. The second branch passage 200d primarily denotes a space surrounded by the rear face portion 310b and the part of the wall section 201 that extends from the side face to the rear face. The outlet of the second branch passage 200d will be referred to as the second outlet 130b throughout the following. The opening areas of the first outlet 130a and the second outlet 130b are changed by the rotation mechanism 400 (which will be described later; see FIGS. 7A-7C) rotating the louver 300. More specifically, in response to the rotation of the louver 300, one of the outlets (e.g., the first outlet 130a) increases the opening area thereof, and the other outlet (e.g., the second outlet 130b) reduces the opening area thereof.

The part of the base body 310 on the side of a leading end 312, in other words, the part of the base body 310 located external to (above) the outlet 130, is formed to face the front (forward) of the housing 110. The base body 310 is formed in such a manner that the distance (thickness) separating the curved face section 310a from the top face portion 310c decreases toward the leading end 312.

The base body 310 is extended in the direction of the outlet 130 from the air passage 200 and curved toward the front of the housing 110. As a result of this structure, the leading end 312 of the base body 310 is positioned approximately above a front-side edge portion 130c of the outlet 130. The first outlet 130a is hence open to the front so as to allow the air flow in the first branch passage 200c to exit through the first outlet 130a in the forward direction. The base body 310, since including the curved face section 310a extended in the direction of the outlet 130 from the air passage 200 and curved toward the front of the housing 110, is capable of efficiently sending out air to the first outlet 130a. In other words, the curved face section 310a serves as a guiding face for guiding the air flow in the first branch passage 200c to the first outlet 130a.

The air flow in the second branch passage 200d is blown out through the second outlet 130b primarily upwardly rearwards in substantially the same direction as the inclination direction of the first air passage 200a. When the air flow is thus blown out, the base body 310 hardly disturbs the air flow in the second branch passage 200d because the base body 310 is disposed toward the front inside the second air passage 200b and the rear face portion 310b is extended upwards (substantially vertically upwards) from the base unit 311. This structure enables the air purifier 100 to blow out air forwards, as well as upwards, via the single outlet 130 in the top face 110e.

Throughout the following, the wall section 201 opposite the curved face section 310a will be referred to also as the first wall section 201a, and the wall section 201 opposite the rear face portion 310b also as the second wall section 201b. The first wall section 201a denotes the part of the outlet 130 that is curved from the front-side edge portion 130c toward the interior bottom part. The second wall section 201b denotes the part of the outlet 130 that is curved from a rear-side edge portion 130d toward the interior bottom part.

The first wall section 201a is formed so as to be separated by a substantially constant distance from the curved face section 310a. In other words, the first wall section 201a includes substantially the same curved surface as the curved face section 310a. This structure enables the first wall section 201a and the curved face section 310a to smoothly guide the air flow in the first branch passage 200c to the first outlet 130a, thereby improving air feeding efficiency. Furthermore, since a part of the louver 300 forms (curved face section 310a) forms the first branch passage 200c, the wind direction can be readily changed by simply rotating the louver 300.

In the structure described above, the wall section 201 is curved so as to expand toward the outlet 130 along the circumferential direction of the outlet 130. Alternatively, the first wall section 201a alone may be curved so as to expand toward the outlet 130.

The wall section 201 is formed, for example, to have the tangent direction thereof approaching the horizontal direction upon moving closer to the outlet 130. This structure enables the air flow along the wall section 201 to be smoothly guided forwards. The wall section 201 is structured to have the tangent direction thereof approaching the horizontal direction along the circumferential direction. Alternatively, the first wall section 201a alone may be formed to have the tangent direction thereof approaching the horizontal direction upon moving closer to the outlet 130.

The outlet 130 is structured, for example, in such a manner that the rear-side edge portion 130d is higher than the front-side edge portion 130c. This structure enables the air flow in the second branch passage 200d to be stably blown out upwardly rearwards.

Figure 7A:
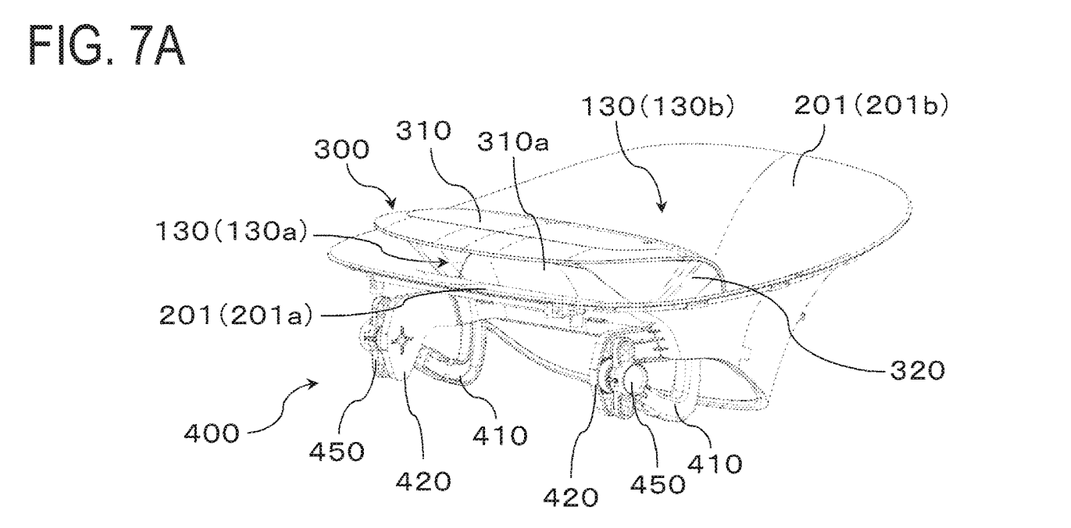
FIG. 7A is a perspective view of a rotation mechanism in the air purifier shown in FIG. 1.

Referring to FIGS. 6 and 7A, the base body 310 includes a pair of sidewalls 320 formed so as to project from the curved face section 310a toward the wall section 201 (first wall section 201a) (downwardly forwards). The sidewalls 320 are respectively disposed on the far left and right sides of the base body 310 and connected to the curved face section 310a through smoothly curved faces.

The pair of sidewalls 320 is capable of restraining the air flowed into the first branch passage 200c from flowing in lateral directions. The pair of sidewalls 320 is capable also of restraining air from flowing in lateral directions (e.g., to the left or to the right) from the first outlet 130a if the distance separating the leading end 312 of the base body 310 from the front-side edge portion 130c of the outlet 130 decreases when the louver 300 is in a second posture (detailed later) so that the blown-out air increases the speed thereof.

Inside the air passage 200 is there provided a damper 330, for example, for changing an air flow rate balance between the first branch passage 200c and the second branch passage 200d. The damper 330 is formed like a thin plate and supports a lower portion such that the lower portion can pivot backwards and forwards around a rotation axis 330a provided in an upper portion. The damper 330, when pivoted, changes an air flow rate balance between the first branch passage 200c and the second branch passage 200d.

The damper 330 is disposed, for example, near the top end portion of the first air passage 200a. The rotation axis 330a is located below the base unit 311 of the base body 310. The damper 330 is structured to switch between three positions. More specifically, the damper 330 is structured to switch between a first position P1 where the damper 330 has the same inclination direction (upwardly rearwards) as the first air passage 200a, a second position P2 where the damper 330 is tilted rearwards toward the upstream end of the air passage 200 (downwards), and a third position P3 where the damper 330 is latched in contact with the frontal wall surface of the first air passage 200a. In the third position P3, the damper 330 is in contact with, and hence latched by, a latch section 330b formed on a frontal wall surface of the first air passage 200a.

The damper 330, when in the first position P1, is structured so as to feed respective predetermined amounts of air to the first branch passage 200c and the second branch passage 200d. The damper 330 increases the air flow rate for the first branch passage 200c when the damper 330 is in the second position P2 over the air flow rate for the first branch passage 200c when the damper 330 is in the first position P1. The damper 330, when in the third position P3, allows substantially no air flow in the first branch passage 200c, in other words, allows almost all air to flow in the second branch passage 200d. This structure where the damper 330 is disposed inside the air passage 200 and configured to be switchable between the three positions (three postures) in this manner enables changing of an air flow rate balance between the first branch passage 200c and the second branch passage 200d.

The air passage 200 includes, for example, a first air flow rectifier 340a for rectifying the air flow entering the first branch passage 200c and a second air flow rectifier 340b for rectifying the air flow entering the second branch passage 200*d*. The first air flow rectifier 340*a* is attached to the first wall section 201*a*. The first air flow rectifier 340*a* is a latticed member formed by combining a plurality of rectification plates in such a manner as to blow out air upwards (substantially vertically upwards). The second air flow rectifier 340*b* is attached to the second wall section 201*b*. The second air flow rectifier 340*b* is a latticed member formed by combining a plurality of rectification plates in such a manner as to blow out air upwardly rearwards. The first air flow rectifier 340*a* and the second air flow rectifier 340*b* are coupled together in the base unit 311 of the base body 310.

Figure 7B:
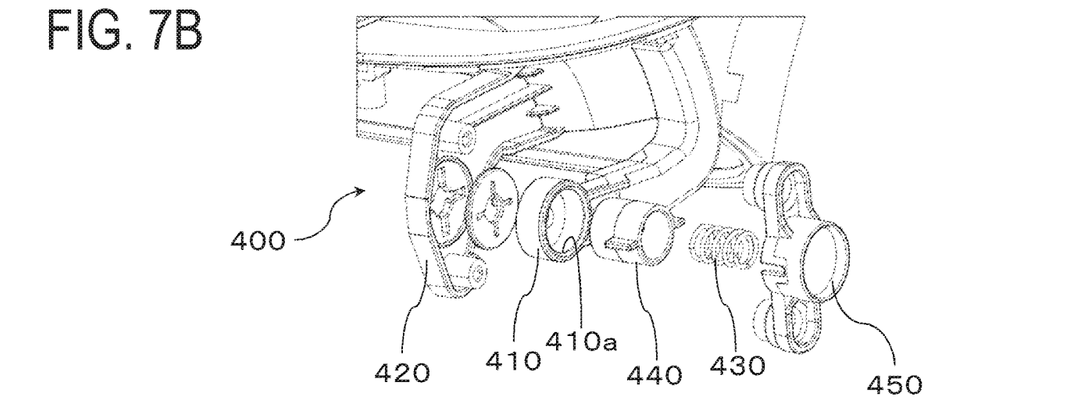
FIG. 7B is an exploded perspective view of the rotation mechanism in the air purifier shown in FIG. 1.
Figure 7C:
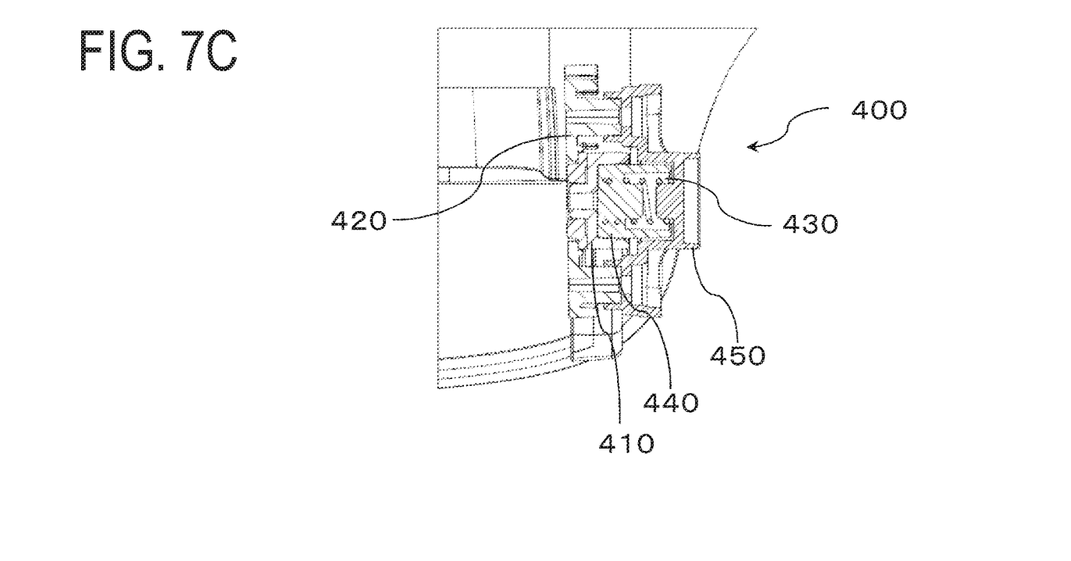
FIG. 7C is an enlarged cross-sectional view of a part of the rotation mechanism in the air purifier shown in FIG. 1.

A description is now given of the rotation mechanism 400 of the louver 300 with reference to FIGS. 7A-7C. FIG. 7A is a perspective view of the rotation mechanism 400 in the air purifier 100. FIG. 7B is an exploded perspective view of the rotation mechanism 400 in the air purifier 100. FIG. 7C is an enlarged cross-sectional view of a part of the rotation mechanism 400 in the air purifier 100. The louver 300 primarily changes the direction of the air (wind) blown out via the first outlet 130*a* through the rotation thereof by the rotation mechanism 400. The rotation mechanism 400 includes rotation arms 410, attachment plates 420, springs 430, spring covers 440, and arm holddown members 450.

Referring to FIG. 7A, the rotation mechanism 400 includes a pair of rotation arms 410 for rotating the base body 310. Each rotation arm 410 is composed of a hollow tubular member and curved so as to project downwards. The rotation arm 410 has a first end thereof supported so as to be pivotable in a space behind the first wall section 201*a*. The space behind the first wall section 201*a* denotes the space surrounded by the first wall section 201*a* and the outer circumferential surface of the housing 110 (e.g., the front face 110*a*). The rotation arm 410 has a second end thereof extended through the bottom portion of the base body 310 and fixed to an internal wall surface (not shown). This structure enables the louver 300 on the second ends of the rotation arms 410 to pivot backwards and forwards around the first ends of the rotation arms 410. The rotation arms 410 are respectively attached to the left and right ends of the base body 310 by a similar mechanism.

Referring to FIGS. 7B and 7C, the rotation arm 410 has an end thereof supported in a pivotable manner by the attachment plate 420 provided behind the first wall section 201*a*. The attachment plate 420 is a platelike member provided so as to project from the first wall section 201*a* toward behind the first wall section 201*a* (toward the front). The rotation mechanism 400 includes the spring 430 for biasing an end of the rotation arm 410 against the attachment plate 420 in the lateral direction. The spring 430 has an end thereof where the spring cover 440 is attached that latches the rotation arm 410 when in contact with the rotation arm 410. The spring cover 440 is cylindrical and is supported so as to be rotatable relative to a recess 410*a* in an end of the rotation arm 410. The spring 430 has the other end thereof attached to the arm holddown member 450 fastened to the attachment plate 420. In other words, the rotation arm 410 is latched by being biased against the attachment plate 420 by the spring cover 440 on which the spring 430 exerts a biasing force between the attachment plate 420 and the arm holddown member 450. The spring 430 exerts a biasing force sufficient to latch the louver 300 in a desired posture.

In the structure described above, as the user applies force in such a direction as to push in or pull out the louver 300 (base body 310), the rotation arms 410 rotate against the biasing force of the springs 430 to rotate the louver 300 to a desired posture. The biasing force of the springs 430 then latches the louver 300 in the desired posture. Additionally, since the rotation arms 410 are hollow, the lead wires connected to the substrate of the operation unit 350 and the substrate of an illumination unit 600 (detailed later) can be guided through the interior of the rotation arms 410 to the outside of the air passage 200.

Figure 8A:
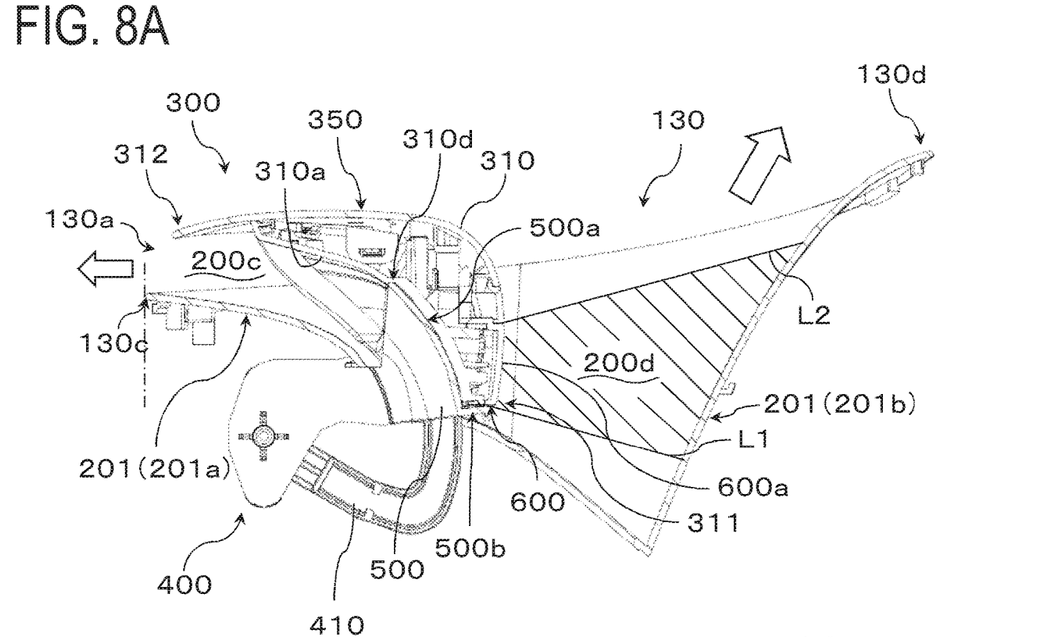
FIG. 8A is a cross-sectional side view of an operation unit of the air purifier shown in FIG. 1 when the operation unit is in a first posture.
Figure 8B:
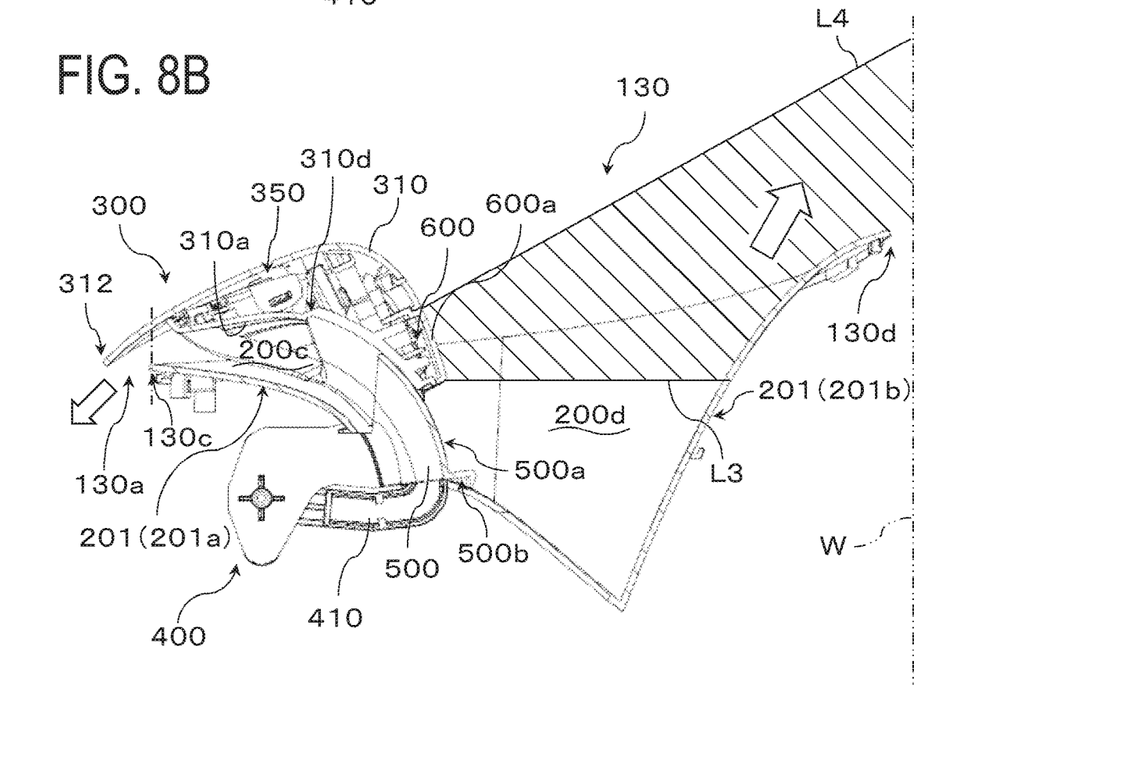
FIG. 8B is a cross-sectional side view of the operation unit of the air purifier shown in FIG. 1 when the operation unit is in a second posture.

A description is now given of the rotation postures of the louver 300 with reference to FIGS. 8A-8B. FIG. 8A is a cross-sectional side view of a first posture of the louver 300. FIG. 8B is a cross-sectional side view of a second posture of the louver 300.

Referring to FIGS. 6 and 8A, when the louver 300 is in the first posture, the leading end 312 of the base body 310 is located substantially above the front-side edge portion 130*c* of the outlet 130. The louver 300 is then disposed such that the curved face section 310*a* of the louver 300 is separated by a substantially constant distance from the first wall section 201*a*. This structure enables the air flow in the first branch passage 200*c* to be efficiently blown out forwards via the first outlet 130*a*. The leading end 312 of the curved face section 310*a* here is positioned inwards of the front-side edge portion 130*c* (housing 110) of the outlet 130.

Referring to FIG. 8B, the louver 300 takes the second posture when the louver 300 is rotated from the first posture in such a manner that the louver 300 can be pulled out forwards. More specifically, when the louver 300 is in the second posture, the leading end 312 of the louver 300 (curved face section 310*a*) is positioned forwards of the housing 110. When the louver 300 is in the second posture, the leading end 312 of the curved face section 310*a* points obliquely downwards. The leading end 312 of the curved face section 310*a* is positioned outwards of (projected from) the front-side edge portion 130*c* (housing 110) of the outlet 130. This structure enables the air flow in the first branch passage 200*c* to be blown out downwardly forwards via the first outlet 130*a*. The distance separating the curved face section 310*a* from the first wall section 201*a* decreases upon moving toward the leading end 312.

The rotation mechanism 400 is structured so as to pivot the louver 300 from the first posture to the second posture as described in the foregoing. This structure enables the user to change the wind direction in accordance with a situation by selecting the first posture when he/she wants to send air forwards in the room where the air purifier 100 is installed and selecting the second posture when he/she wants to send air toward the bottom of the room. The structure also accommodates the rotation mechanism 400 in the space behind the first wall section 201*a*, thereby making efficient use of an existing space without much effort in mounting the rotation mechanism 400. In addition, since the operation unit 350 is built around a touch panel, the user does not need to push in the operation unit 350 to make settings for various operations. The user can hence make settings for various operations without carelessly pivoting the louver 300 even when the louver 300 is pivotable. The louver 300 is manually rotatable and may alternatively be rotated using, for example, an electric motor.

Referring to FIGS. 8A-8B, above the first air flow rectifier 340*a*, there is provided a guiding section 500 in the air passage 200. The guiding section 500 guides wind to the wind channel (first branch passage 200*c*) composed of the curved face section 310*a* and the wall section 201 (first wall section 201*a*). The guiding section 500 is attached, for example, to the first wall section 201*a* or the first air flow rectifier 340*a*. The guiding section 500 is a hollow duct-like member shaped like a fan in a side view. The guiding section 500 takes in air through an opening (not shown) in the bottom thereof and sends out the air through an opening (not shown) in the front.

The guiding section 500 includes a sliding surface 500a supporting the base body 310 in such a manner that the base body 310 can slide with the rotation of the louver 300. The sliding surface 500a is composed of a surface that constitutes the outer circumferential surface of the guiding section 500 and more specifically a surface that constitutes an arc portion in a side view. The sliding surface 500a and the bottom of the curved face section 310a of the louver 300 are formed to follow the trajectory of rotation of the louver 300 around the center of rotation thereof. When the louver 300 is in the first posture, the sliding surface 500a is in intimate contact with the bottom of the curved face section 310a of the louver 300. As the louver 300 is rotated forwards from the first posture, the curved face section 310a of the louver 300 slides on the sliding surface 500a to the second posture. When the louver 300 is in the second posture, the sliding surface 500a is partially in intimate contact with the bottom of the curved face section 310a of the louver 300.

Referring to FIGS. 8A-8B, the curved face section 310a of the louver 300 is provided thereon with, for example, a latch section 310d for regulating backward pivoting. The latch section 310d includes a step portion provided on a middle portion of the curved face section 310a to stop the motion of the top of the guiding section 500. This structure regulates the motion of the louver 300 in such a manner as to prevent the louver 300 from pivoting backwards beyond the first posture. A support unit 500b projecting backwards is provided on the bottom end portion of the sliding surface 500a to support the base unit 311 of the louver 300. This structure stably supports the louver 300 in the first posture.

The provision of the sliding surface 500a on the trajectory of rotation of the louver 300 as described in the foregoing enables the stable support and pivoting of the louver 300. The provision also makes it possible to unfailingly introduce air into the first branch passage 200c via the guiding section 500 even when the louver 300 is pivoted forwards.

A description is now given of the illumination unit 600 for emitting light onto the air passage 200 with reference to FIGS. 8A-8B. In FIG. 8A, the area illuminated by the illumination unit 600 ("area of illumination of the illumination unit 600") when the louver 300 is in the first posture is schematically shown as the region surrounded by the straight lines denoted by L1 and L2 (hatched region). In FIG. 8B, the area of illumination of the illumination unit 600 when the louver 300 is in the second posture is schematically shown as the region surrounded by the straight lines denoted by L3 and L4 (hatched region).

The air purifier 100 includes the illumination unit 600 for emitting light onto a curved surface of the downstream side of the air passage 200. In other words, the illumination unit 600 is structured to emit light onto the wall section 201 provided as a curved surface of the second air passage 200b. The illumination unit 600, as an example, emits light onto the rear face of the housing 110 (rearwards). The air purifier 100 emits light onto the wall section 201 provided as a curved surface and may alternatively emit light, for example, onto the wall section 201 provided as an inclined face.

The illumination unit 600 is disposed, for example, in the louver 300 for changing the wind direction. More specifically, the illumination unit 600 is disposed on the rear face (rear face portion 310b) of the louver 300. The illumination unit 600 is disposed downwards of the outlet 130.

The illumination unit 600 is composed of, for example, an LED light source (not shown) and lenses (not shown) for bending the light emitted by the LED light source. The LED light source is provided inside the base body 310. The lenses are disposed facing the light source on the light-emitting side of the light source inside the base body 310. The lenses have such optical properties that the LED light source can emit light in a prescribed direction (e.g., in the direction of the rear face of the housing 110). That part of the rear face portion 310b of the base body 310 that crosses the direction of the light emitted by the LED light source is provided as a transmissive region 600a. The transmissive region 600a is formed by, for example, molding transmissive glass or resin. The light from the LED light source is guided to travel in a prescribed direction by using lenses and may alternatively be guided to travel in a prescribed direction, for example, by fabricating a platelike member (cover member) of the transmissive region 600a in a lens-like shape.

In the structure described above, the light emitted by the illumination unit 600 travels via the transmissive region 600a and illuminates the wall section 201 provided as a curved surface and more specifically the second wall section 201b. The outlet 130 and the vicinity thereof can be illuminated by forming the surface illuminated by the light emitted by the illumination unit 600 as a curved surface and having the curved surface reflect (scatter) the light in this manner. In addition, by curving the second wall section 201b in such a manner that the second wall section 201b expands toward the outlet 130, the user can easily recognize the light reflected (scattered) by the second wall section 201b. Additionally, by curving the second wall section 201b in such a manner that the second wall section 201b has a tangent that approaches the horizontal direction upon moving toward the outlet 130, the light hitting an edge of the outlet 130 is likely to be reflected (scattered) upwards. Furthermore, by forming the wall section 201 as a curved surface in a plan view, the light hitting the wall section 201 is likely to be reflected (scattered) in every direction (forwards, rearwards, leftwards, and rightwards). This mechanism enables the user to readily recognize the light reflected (scattered) by the second wall section 201b and at the same time reduces the risk of the user's eyes being exposed directly to the light emitted by the illumination unit 600, in other words, the chances of the user finding the light excessively bright. The mechanism thereby gives the user a soft impression and reduces the risk of corrupting the atmosphere of the room. The illumination unit 600 is disposed below the outlet 130. The illumination unit 600 is disposed behind the louver 300. This arrangement reduces the risk of the user's eyes being exposed directly to the light emitted by the illumination unit 600. The outlet 130, structured in such a manner that the rear-side edge portion 130d is higher than the front-side edge portion 130c, allows for an increased light-distribution area on the rear side, thereby improving visibility for the user.

A description is now given of the area of illumination of the illumination unit 600 when the louver 300 is in the first posture and in the second posture with reference to FIGS. 8A and 8B. The illumination unit 600 is configured such that the area of illumination thereof covers at least the second wall section 201b irrespective of the posture of the louver 300. Referring to FIG. 8A, the area of illumination of the illumination unit 600 primarily matches the second wall section 201b when the louver 300 is in the first posture. In other words, the illumination unit 600 is configured to emit light onto the second wall section 201b when the louver 300 is in the first posture. Referring next to FIG. 8B, the illumination unit 600 is configured such that the range of illumination thereof covers at least the second wall section 201b when the louver 300 is in the second posture. More specifically, the illumination unit 600 is configured to have an optical axis (not shown) on an edge of the second wall section 201b close to the outlet 130, in other words, near the rear-side edge portion 130d of the outlet 130. These configurations enables the illumination unit 600 to more brightly illuminate the area close to the outlet 130. Additionally, when the louver 300 is in the second posture, the illumination unit 600 can illuminate the upward of the outlet 130, for example, an indoor wall surface W located backwards in the housing 110, as well as the second wall section 201b.

The configuration described in the foregoing where at least the second wall section 201b is illuminated irrespective of the direction in which air is blown out (i.e., irrespective of the rotation posture of the louver 300) reduces the chances of the user finding the light excessively bright and gives the user a soft optical impression. Additionally, the user can intuitively know the direction in which air (wind) is blown out by changing the region illuminated by the illumination unit 600 in accordance with the direction in which air is blown out (the rotation posture of the louver 300). The illumination unit 600 is configured to illuminate closer to the outlet 130 when the louver 300 is in the second posture than when the louver 300 is in the first posture and may alternatively be configured to illuminate the same part of the second wall section 201b irrespective of the rotation posture of the louver 300.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An air purifier comprising:
   a housing;
   a fan in the housing;
   an outlet in a top face of the housing, air being blown out via the outlet;
   an air passage spatially connecting the fan to the outlet; and
   an illumination unit configured to illuminate the air passage, wherein
   the air passage includes an upstream, first air passage and a downstream, second air passage, the first air passage extends upwards,
   the second air passage has a curved surface or an inclined surface inclined with respect to the first air passage, and
   the illumination unit emits light toward the curved surface or the inclined surface.

2. The air purifier according to claim 1, wherein the curved surface or the inclined surface is formed so as to expand toward the outlet.

3. The air purifier according to claim 1, further comprising a louver configured to change a direction of the air, wherein the illumination unit is mounted to the louver.

4. The air purifier according to claim 3, wherein the illumination unit is disposed on a rear side of the louver.

5. The air purifier according to claim 1, wherein the outlet has a front-side edge portion and a rear-side edge portion higher than the front-side edge portion.

6. An air purifier comprising:
   a housing;
   a fan in the housing;
   an outlet in a top face of the housing, air being blown out via the outlet;
   an air passage spatially connecting the fan to the outlet;
   an illumination unit configured to illuminate the air passage; and
   a louver configured to change a direction of the air, wherein
   the air passage includes an upstream, first air passage and a downstream, second air passage, the first air passage extends upwards,
   the second air passage has a curved surface or an inclined surface inclined with respect to the first air passage, and
   the illumination unit is mounted to the louver and illuminates the curved surface or the inclined surface.

7. The air purifier according to claim 6, wherein the illumination unit is disposed on a rear side of the louver.

* * * * *